(12) United States Patent
Hosokura et al.

(10) Patent No.: US 6,939,619 B2
(45) Date of Patent: Sep. 6, 2005

(54) METAL POWDER, METHOD FOR PRODUCING THE SAME, CONDUCTIVE PASTE USING THE SAME, AND MONOLITHIC CERAMIC ELECTRONIC COMPONENT

(75) Inventors: Tadasu Hosokura, Omihachiman (JP); Atsuyoshi Maeda, Otsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 221 days.

(21) Appl. No.: 10/378,947

(22) Filed: Mar. 5, 2003

(65) Prior Publication Data

US 2003/0164065 A1 Sep. 4, 2003

Related U.S. Application Data

(62) Division of application No. 09/863,739, filed on May 23, 2001.

(30) Foreign Application Priority Data

| May 30, 2000 | (JP) | ............ 2000-160270 |
| Mar. 12, 2001 | (JP) | ............ 2001-068700 |

(51) Int. Cl.[7] .................................................. B32B 5/30
(52) U.S. Cl. .................... 428/548; 428/551; 75/252; 75/255
(58) Field of Search ................ 75/252, 255; 428/548, 428/551

(56) References Cited

U.S. PATENT DOCUMENTS

| 3,988,651 A | * | 10/1976 | Hertz ........................ 361/305 |
| 5,061,313 A | * | 10/1991 | Davies et al. ................ 75/362 |
| 5,853,451 A | * | 12/1998 | Ishikawa ..................... 75/367 |
| 6,120,576 A | * | 9/2000 | Toshima et al. .............. 75/370 |
| 6,312,496 B1 | * | 11/2001 | Katayama et al. ............ 75/255 |
| 6,585,796 B2 | * | 7/2003 | Hosokura et al. ............ 75/373 |
| 6,730,400 B1 | * | 5/2004 | Komatsu et al. ............ 428/403 |

FOREIGN PATENT DOCUMENTS

JP     62-041238 A     *  2/1987

* cited by examiner

Primary Examiner—George Wyszomierski
(74) Attorney, Agent, or Firm—Dickstein, Shapiro, Morin & Oshinsky, LLP.

(57) ABSTRACT

A metal powder is formed by the steps of preparing a reducing agent solution, preparing a mixed metallic salt solution by dissolving a nickel salt and a copper salt in a solvent, and mixing the reducing agent solution and the mixed metallic salt solution so that the copper salt is reduced to precipitate copper particle nuclei and then the nickel salt is reduced to precipitate nickel around the copper particle nuclei. A metal power produced by this production method, a conductive paste containing the metal powder and a monolithic ceramic electronic component in which internal electrodes are formed using the conductive paste are also disclosed.

18 Claims, 3 Drawing Sheets

METAL POWDER, METHOD FOR PRODUCING THE SAME, CONDUCTIVE PASTE USING THE SAME, AND MONOLITHIC CERAMIC ELECTRONIC COMPONENT

This is a divisional of U.S. patent application Ser. No. 09/863,739, filed May 23, 2001.

BACKGROUND OF THE INVENTION

1. Field of the Invention

The present invention relates to a metal powder, a conductive paste using the metal powder, a monolithic ceramic electronic component in which internal electrodes are formed using the conductive paste, and to a method for producing the metal powder.

2. Description of the Related Art

A monolithic ceramic electronic component, such as a monolithic ceramic capacitor, usually includes a ceramic laminate comprising dielectric ceramic layers, internal electrodes provided between the dielectric ceramic layers, and terminal electrodes electrically connected to the internal electrodes.

The ceramic laminate is formed by firing a green ceramic laminate in which a plurality of green ceramic sheets composed of a dielectric ceramic material are laminated. In order to form the internal electrodes, a conductive paste is printed on a plurality of the green ceramic sheets, and then the conductive paste is fired simultaneously with the green ceramic laminate. One of the ends of each internal electrode is exposed to one end face of the ceramic laminate. A conductive paste is applied to both end faces of the ceramic laminate so as to be connected to the exposed ends of the internal electrodes, followed by baking, to produce the terminal electrodes.

As described above, a conductive paste is used for forming internal electrodes of monolithic ceramic electronic components, in particular, monolithic ceramic capacitors. The conductive paste contains a metal powder which acts as a conductive constituent, and recently, noble metal powders such as silver powder or palladium powder, and base metal powders such as nickel powder or copper powder, have been used. As the size and thickness of monolithic ceramic electronic components decrease, a demand for production of fine metal powder, which is contained in conductive paste used for forming internal electrodes of the monolithic ceramic electronic components, is arising.

Conventionally, methods, such as a vapor phase process, for producing fine metal powder having a small particle size are used. However, since the cost of producing metal powder by the vapor phase process is high, there is a demand for producing metal powder having a small particle size by a liquid phase process.

For example, Japanese Examined Patent Application Publication No. 6-99143 discloses a method for producing metal powder by a liquid phase process in which a nickel salt solution is reduced in the liquid phase using a borohydride solution, such as a sodium borohydride solution, as the reducing agent, in order to obtain a metal powder having a small particle size.

However, since the boron in the reducing agent solution in the method disclosed in Japanese Examined Patent Application Publication No. 6-99143 is precipitated as an alloy or impurity in the metal powder, the purity of the resulting metal powder may be reduced. Consequently, the electrical properties of the metal powder are degraded, thereby making it unsuitable for use as the conductive constituent for forming internal electrodes in monolithic ceramic electronic components.

In order to inhibit the inclusion of impurities during the production of metal powder by a liquid phase process, for example, Japanese Unexamined Patent Application Publication No. 5-43921 discloses a method in which a solution containing basic nickel carbonate is reduced using hydrazine as the reducing agent. Since hydrazine is used as the reducing agent, impurities are not substantially precipitated in the metal powder during the reduction reaction. However, the minimum average particle size of the metal powder obtained by this method is 100 nm, which is too large for use as the conducting constituent to be contained in conductive paste for forming internal electrodes used for thinner monolithic ceramic electronic components.

SUMMARY OF THE INVENTION

The present invention has been achieved to overcome the problems described above. Objects of the present invention are to provide a method for producing a metal powder using a liquid phase process in which the resulting metal powder has an average particle size of about 100 nm or less and impurities are not substantially generated by a reducing agent, to provide a metal powder obtained by such a method, to provide a conductive paste using the metal powder, and to provide a monolithic ceramic electronic component using the conductive paste.

In one aspect of the present invention, a method for producing a metal powder includes the steps of preparing a reducing agent solution; preparing a mixed metallic salt solution in which a nickel salt and a copper salt are dissolved in a solvent; and mixing the reducing agent solution and the mixed metallic salt solution so that the copper salt is reduced to precipitate copper particle nuclei and then the nickel salt is reduced to precipitate nickel around the copper particle nuclei.

In accordance with the present invention, it is possible to produce a metal powder by a liquid phase process, which has an average particle size of about 100 nm or less and which is suitable for use in the formation of internal electrodes of monolithic ceramic electronic components.

Preferably, at least one of the nickel salt and the copper salt is at least one selected from the group consisting of chloride, sulfate and nitrate.

Preferably, the copper content is about $4.6 \times 10^{-7}$ to 5 percent by weight relative to 100% by weight of nickel in the mixed metallic salt solution.

Consequently, it is possible to reliably produce a metal powder which has an average particle size of about 100 nm or less and which is suitable for use in the formation of internal electrodes of monolithic ceramic electronic components.

Preferably, the reducing agent solution is prepared by dissolving a caustic alkali and at least one of hydrazine and hydrazine hydrate in a solvent, and more preferably, the caustic alkali is at least one material selected from the group consisting of potassium hydroxide, sodium hydroxide, calcium hydroxide, barium hydroxide and ammonia.

Consequently, it is possible to more reliably produce, by the liquid phase process, a metal powder which has an average particle size of 100 nm or less, in which impurities are not substantially generated by the reducing agent, and which is suitable for use in the formation of internal electrodes of monolithic ceramic electronic components.

Preferably, the solvent is a mixture of an alcohol and water. By using such a solvent, it is possible to control the particle size of the metal powder precipitated by changing the alcohol content in the solvent.

In another aspect of the present invention, a metal powder is produced by the method of the present invention described above. That is, nickel is formed around fine copper particles which act as nuclei in the metal powder.

Preferably, the copper content is about $4.54 \times 10^{-7}$ to 4.62 percent by weight relative to 100% by weight of nickel in the metal powder. Preferably, the metal powder has an average particle size of about 100 nm or less.

In another aspect of the present invention, a conductive paste contains the metal powder of the present invention and an organic vehicle. By using such a conductive paste, it is possible to form internal electrodes used for thinner monolithic ceramic electronic components.

In another aspect of the present invention, a monolithic ceramic electronic component includes a ceramic laminate including a plurality of dielectric ceramic layers and internal electrodes formed between the dielectric ceramic layers, in which the internal electrodes are formed using the conductive paste of the present invention.

In the monolithic ceramic electronic component of the present invention, internal electrodes which are thinner than conventional internal electrodes are provided, and it is possible to inhibit the delamination of the electrodes, decrease in coverage, occurrence of cracking and increase in the ESR.

DESCRIPTION OF THE PREFERRED EMBODIMENTS

A method for producing a metal powder in accordance with the present invention, is characterized in that, by mixing a copper salt in a metallic salt solution containing a nickel salt, metallic copper is precipitated by the reduction of the copper salt, and then nickel is precipitated using fine particles of the precipitated metallic copper as nuclei. The metal powder thus obtained is a metal powder in which the nickel has grown using the fine copper particles as nuclei and is therefore substantially a nickel powder.

Copper has a higher oxidation-reduction potential than that of nickel. When the salt of copper, which has a higher oxidation-reduction potential than nickel, is added to the metallic salt solution containing a nickel salt, copper precipitates first, and then nickel precipitates. Since the nickel precipitated later grows using copper fine particles which are precipitated earlier as nuclei, fine nickel particles can be formed without nucleation of nickel. In particular, since the oxidation-reduction potential of copper is close to that of nickel, by selecting copper as a metal which acts as a nickel-particle-forming nucleus, the precipitation rate of nickel is easily controlled, and thus high-purity nickel of a desired particle size can be obtained.

The nickel salt and the copper salt are preferably salts which are satisfactorily soluble in a selected solvent, and examples of such metallic salts include chlorides, sulfates and nitrates.

In the mixed metallic salt solution, preferably, the copper content is about $4.6 \times 10^{-7}$ to 5 percent by weight relative to 100% by weight of nickel. If the copper content is 5 by weight or less, copper precipitates in a desirable quantity, not excessively, and the resistance of the resulting metal powder is not very high, and thus the metal powder is suitable for use as a conductive constituent in the conductive paste for forming internal electrodes of monolithic ceramic components. If the copper content is about $4.6 \times 10^{-7}$ percent by weight or more, the quantity of copper precipitated for forming nuclei is desirable, and not too small.

Preferably, the reducing agent solution is prepared by dissolving an caustic alkali, and at least one of hydrazine and hydrazine hydrate in a solvent. When metallic ions are reduced by hydrazine, which is a reducing agent, impurities do not substantially precipitate in the reduced metal, and thus it is possible to inhibit the precipitation of impurities such as boron which decrease the melting point of the metal powder.

The caustic alkali is essential for providing the hydroxide ions required when hydrazine reduces metallic salts. Preferably, the caustic alkali is at least one selected from the group consisting of potassium hydroxide sodium hydroxide, calcium hydroxide, barium hydroxide and ammonium hydroxide. Among these materials, sodium hydroxide is most preferable.

Preferably, a mixed solution composed of an alcohol and water is used as the solvent for the mixed metallic salt solution or the solvent for the reducing agent solution. Water is added to an alcohol solvent, and by changing the alcohol content of the solvent, the particle size of the precipitated metal powder can be controlled. Additionally, if only an alcohol is used as the solvent, the solubility of metallic ions can be decreased, thereby enabling an increase in the precipitation rate of the metal. Consequently, the particle size of the precipitated metal powder can be easily controlled, although the production cost is high. On the other hand, if only water is used as the solvent, although the production cost is low, it is difficult to control the precipitation rate of the metal and the particle size of the metal powder precipitated becomes large.

In a preferred embodiment, sodium hydroxide is dissolved at a molarity of about 0.5 to 5 moles/liter in a mixed solvent containing ethanol and water at a ratio of about 50:50, and at least one of hydrazine or a hydrazine hydrate is dissolved therein in the range of from the amount stoichiometrically required for reducing the nickel salt and copper salt to about 15 times the required amount to prepare a reducing agent solution.

For example, $1.0 \times 10^{-2}$ to 1.0 mole/liter of nickel sulfate and a slight amount of copper sulfate can be dissolved in a mixed solvent containing ethanol and water at a ratio of about 50:50 to prepare a mixed metallic salt solution.

The reducing agent solution and the mixed metallic salt solution are mixed while maintaining the temperature at about 20 to 60° C. to produce a mixed solution. If the temperature of the mixed solution, i.e., the reaction temperature, is about 20° C. or more, the reduction reaction proceeds smoothly. If the temperature of the mixed solution is about 60° C. or less, since ethanol or the like contained in the solvent does not vaporize, the concentration of the mixed solution is not easily changed. The reduction reaction takes place at a high pH, and since the reducing agent solution has a pH of approximately 13 and the mixed metallic salt solution has a pH of approximately 5, by adding the mixed metallic salt solution to the reducing agent solution dropwise, the reduction reaction proceeds while a high pH is maintained. Therefore, although the mixing procedure is not particularly limited, the mixed metallic salt solution is preferably added dropwise to the reducing agent solution while it is being stirred.

In the mixed solution, the copper salt is reduced first during the reduction reaction, and metallic copper particles are precipitated as fine nuclei. At this stage, since copper has a relatively high oxidation-reduction potential, copper is precipitated faster than nickel, and the nuclei of copper particles are finer than nuclei of nickel particles. A larger number of nuclei is generated compared to the reduction reaction using a metallic-salt solution which does not contain a copper salt.

After the precipitation of copper, nickel precipitates. Since the nuclei of copper particles are finer than the nuclei of nickel particles, nickel precipitates in the form of fine particles. The metal powder is recovered from the mixed solution in which the reduction reaction occurs, and is washed and then dried. The metal powder thus obtained has an average particle size of about 100 nm or less, the variation in particle sizes is small and the particle size distribution is narrow.

The metal powder of the present invention is obtained by the method for producing the metal powder described above. Particles of the metal powder have copper as nuclei and nickel formed on the surfaces thereof. In the metal powder, the copper content is preferably about 4.62 to $4.54 \times 10^{-7}$ percent by weight relative to 100% by weight of nickel in the metal powder. If the copper content is about $4.62 \times 10^{-7}\%$ by weight or less, the resistance of the metal powder is appropriate, not excessive, and thus the metal powder is suitable for use as the conducting constituent contained in a conductive paste for forming internal electrodes of monolithic ceramic electronic components. On the other hand, if the copper content is about $4.54 \times 10^{-7}$ percent by weight or more, when internal electrodes of a monolithic ceramic electronic component are formed using such a metal powder, it is possible to prevent delamination of the internal electrodes, decrease in coverage, occurrence of cracking and increase in equivalent series resistance (ESR).

A conductive paste of the present invention contains a metal powder of the present invention and an organic vehicle. Although the organic vehicle used is not particularly limited, for example, an organic vehicle may be used in which about 25% by weight of an organic binder comprising an ethyl cellulose resin and an alkyd resin and about 75% by weight of an organic solvent comprising ethyl carbitol, 1-octanol and a kerosene-based solvent are mixed.

Although the ratio of the metal powder to the organic vehicle in the conductive paste is not particularly limited in the present invention, for example, a conductive paste may be composed of about 40 parts by weight of the metal powder and about 60 parts by weight of the organic vehicle. In addition to the metal powder and the organic vehicle, the conductive paste may further contain additives, such as a plasticizer, an anti-thickening agent and a dispersing agent.

Figure 1:
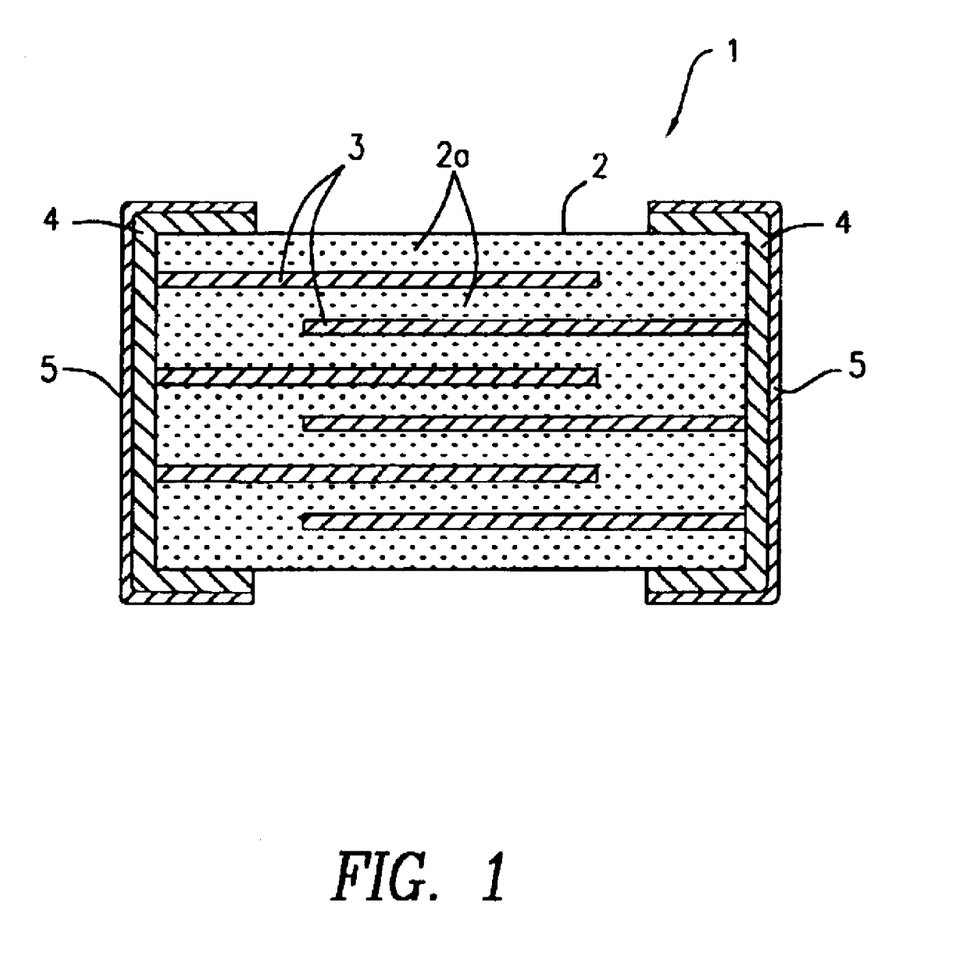
FIG. 1 is a sectional view of a monolithic ceramic electronic component in an embodiment of the present invention.

Next, a monolithic ceramic electronic component in an embodiment of the present invention will be described in detail with reference to FIG. 1.

A ceramic electronic component 1 includes a ceramic laminate 2, internal electrodes 3, terminal electrodes 4 and plating films 5.

The ceramic laminate 2 is formed by firing a green ceramic laminate comprising a plurality of ceramic layers 2a composed of a dielectric material containing $BaTiO_3$ as a principal constituent.

The internal electrodes 3 are disposed between the plurality of ceramic layers 2a constituting the ceramic laminate 2, and are formed by printing a conductive paste on ceramic green sheets and by simultaneously firing the conductive paste and the ceramic green sheets. One end of each internal electrode 3 is exposed at one end face of the ceramic laminate 2.

The terminal electrodes 4 are formed by applying a conductive paste or the like to both end faces of the ceramic laminate 2 so as to be electrically and mechanically connected to the exposed ends of the internal electrodes 3, followed by baking.

The plating films 5 are formed, for example, by electroless plating using tin, nickel or the like, or by solder plating, and at least one plating layer is formed on the terminal electrodes 4.

Additionally, the ceramic laminate 4 may be composed of other dielectric material, such as $PbZrO_3$, an insulating material, a magnetic material, a semiconductor material, or the like. The number of the internal electrodes 3 is not limited to that in the embodiment described above, and any number of layers of the internal electrodes 3 is acceptable. The shape, the location and the number of the terminal electrodes 4 are not limited to those in the embodiment described above, and for example, wiring patterns provided on the ceramic laminate may be acceptable. The plating films 5 are not always required, or may be composed of any number of plating layers. The ceramic laminate 2 may further contain via-holes, etc.

The present invention will be described below in more detail based on the examples.

EXAMPLE 1

Production and Evaluation of Metal Powder

A reducing agent solution was prepared by dissolving 12 g of sodium hydroxide and 30 g of 80% hydrazine hydrate in 50 ml of ethanol. A mixed metallic salt solution of each of Sample Nos. 1 to 11 was prepared by dissolving 30.0 g of nickel sulfate (Ni content: 7.4 g) and copper sulfate in the amounts shown in Table 1 below, i.e., 10.0 to $1.0 \times 10^{-9}$ g (Cu content: 3.7 to $3.7 \times 10^{-10}$ g) in 100 ml of ethanol.

On the other hand, a metallic-salt solution of Sample No. 12 was prepared by dissolving 30.0 g of nickel sulfate alone in 100 ml of ethanol.

Next, with the temperatures of both solutions being retained at 60° C., the metallic salt solution was introduced into the reducing agent solution to obtain a mixed solution to start the reduction reaction.

After the reduction reaction was completed, the solid phase and the liquid phase were separated. The solid constituent was recovered and washed with pure water and acetone in that order, and then drying was performed in an oven. Thus, metal powders of Sample Nos. 1 to 12 were obtained.

For comparison, a nickel powder of Sample No. 13 was produced by a vapor phase process.

TABLE 1

| Sample No. | Nickel Salt | | Copper Salt | | |
|---|---|---|---|---|---|
| | Ni (g) | Nickel Sulfate (g) | Cu (g) | Copper Sulfate (g) | Cu/Ni (%) |
| 1 | 7.4 | 30.0 | 3.7 | 10.0 | 50 |
| 2 | | | $3.7 \times 10^{-1}$ | 1.0 | 5 |
| 3 | | | $3.7 \times 10^{-2}$ | $10^{-1}$ | 0.5 |
| 4 | | | $3.7 \times 10^{-3}$ | $10^{-2}$ | 50.05 |
| 5 | | | $3.7 \times 10^{-4}$ | $10^{-3}$ | $5 \times 10^{-3}$ |
| 6 | | | $3.7 \times 10^{-5}$ | $10^{-4}$ | $5 \times 10^{-4}$ |
| 7 | | | $3.7 \times 10^{-6}$ | $10^{-5}$ | $5 \times 10^{-5}$ |
| 8 | | | $3.7 \times 10^{-7}$ | $10^{-6}$ | $5 \times 10^{-6}$ |
| 9 | | | $3.7 \times 10^{-8}$ | $10^{-7}$ | $5 \times 10^{-7}$ |
| 10 | | | $3.7 \times 10^{-9}$ | $10^{-8}$ | $5 \times 10^{-8}$ |
| 11 | | | $3.7 \times 10^{-10}$ | $10^{-9}$ | $5 \times 10^{-9}$ |
| 12 | | | | 0 | |
| 13 | | | Produced by Vapor Phase Process | | |

With respect to the metal powders of Sample Nos. 1 to 13, the Ni content, the Cu content, the ratio of Cu to Ni (%), and the average particle size were measured, and the average particle size was evaluated. The results thereof are shown in Table 2.

Additionally, the Ni content and the Cu content in the metal powder of each sample were measured using inductively coupled plasma-Auger electron spectroscopy (ICP-AES).

Using the metal powder of Sample No. 13 produced by the vapor phase process as the point of reference, metal powders which had an average particle size up 60% of the Sample No. 13 metal powder were ranked "B", and B ranked metal powder which displayed a particularly narrow particle size distribution was ranked "A". Excluding the metal powders corresponding to "B" and "A", any metal powder which had a smaller average particle size than that of the metal powder of Sample No. 12 which did not contain copper was ranked "C". Power which had an average particle size larger than the reference Sample No. 13, such as the conventional metal powder of Sample No. 12, was ranked "F".

TABLE 2

| | Metal Powder | | | | |
|---|---|---|---|---|---|
| Sample No. | Ni Content (wt %) | Cu Content (wt %) | Cu/Ni (%) | Average Particle Size (nm) | Evaluation |
| 1 | 41.2 | 51.3 | 125 | 31 | A |
| 2 | 92.3 | 4.52 | 4.90 | 40 | B |
| 3 | 94.5 | $4.55 \times 10^{-1}$ | $4.81 \times 10^{-1}$ | 41 | B |
| 4 | 95.8 | $4.57 \times 10^{-2}$ | $4.77 \times 10^{-2}$ | 41 | B |
| 5 | 95.9 | $4.59 \times 10^{-3}$ | $4.79 \times 10^{-3}$ | 42 | B |
| 6 | 96.3 | $4.62 \times 10^{-4}$ | $4.80 \times 10^{-4}$ | 42 | B |
| 7 | 96.6 | $4.63 \times 10^{-5}$ | $4.79 \times 10^{-5}$ | 42 | B |
| 8 | 96.9 | $4.65 \times 10^{-6}$ | $4.80 \times 10^{-6}$ | 43 | B |
| 9 | 97.0 | $4.65 \times 10^{-7}$ | $4.79 \times 10^{-7}$ | 43 | B |
| 10 | 98.1 | $4.66 \times 10^{-8}$ | $4.75 \times 10^{-8}$ | 75 | C |
| 11 | 98.5 | $4.66 \times 10^{-9}$ | $4.73 \times 10^{-9}$ | 77 | C |
| 12 | 98.7 | — | — | 95 | F |
| 13 | 97.3 | — | — | 80 | — |

As is obvious from Table 2, the average particle sizes of the metal powders of Sample Nos. 1 to 11 containing copper particles as nuclei were smaller than 95 nm which was the average particle size of the metal powder of Sample No. 12 which did not contain copper.

As the Cu content increased, the average particle size decreased, and the metal powder of Sample No. 1, in which the Cu content was 125 percent by weight relative to 100% by weight of Ni, had the smallest average particle size at 31 nm.

Fabrication and Evaluation of Monolithic Ceramic Capacitor

Next, conductive pastes containing the metal powders of Sample Nos. 1 to 13 were produced, and monolithic ceramic capacitors were fabricated using the conductive pastes, and then the monolithic ceramic capacitors were evaluated.

First, 40% by weight of an organic vehicle produced by dissolving 10 parts by weight of an ethyl cellulose resin as an organic binder in 90 parts by weight of terpineol as a solvent, and 50% by weight of the metal powder for each of Sample Nos. 1 to 11, were added to 10% by weight of terpineol, and mixing was performed thoroughly using a three roller mill. Thus, conductive pastes of Sample Nos. 1 to 13 were produced.

As a ceramic powder, barium titanate ($BaTiO_3$) powder having an average particle size ($D_{50}$) of 0.5 µm, which was produced by hydrolysis, was prepared.

To the barium titanate powder, an additive (a sintering aid containing 0.02 mol percent of Dy, 0.02 mol percent of Mg, 0.02 mol percent of Mn and 3 mol percent of Si) was added in the form of oxide powder or carboxide powder, and mixing was performed. A polyvinyl butyral-based binder and an organic solvent, such as ethanol, were added thereto, and wet mixing was performed with a ball mill to prepare a ceramic slurry.

The ceramic slurry was formed into ceramic green sheets with a thickness of 1.4 µm using the doctor blade method by adjusting the width of the slit of the doctor blade.

Each of the conductive pastes of Sample Nos. 1 to 13 was screen-printed on a predetermined number of ceramic green sheets so that, when a ceramic laminate is formed using the ceramic green sheets, one end of the conductive paste is exposed to either end face of the ceramic laminate and the other end is in the interior of the ceramic laminate. By adjusting the thickness of the screen pattern, a plurality of ceramic green sheets provided with electrode films with a thickness after drying of 0.6 µm were formed for each of Sample Nos. 1 to 13.

Next, the plurality of ceramic green sheets provided with electrode films were laminated and hot-pressed for integration, followed by cutting into a predetermined size, and thus green ceramic laminates of Sample Nos. 1 to 13 were obtained. The organic binder was then burned by heating at 400° C. in a nitrogen atmosphere, and firing was performed in a reducing atmosphere comprising a mixed gas of $H_2$—$N_2$—$H_2O$ with an oxygen partial pressure of $9 \times 10^{-12}$ MPa while being retained for 3 hours at a maximum firing temperature of 1,200° C., and thus ceramic laminates of Sample Nos. 1 to 13 were obtained. In each of the fired ceramic laminates, the number of effective dielectric ceramic layers was 200 and the area of the internal electrode per layer was $16.2 \times 10^{-6}$ m$^2$.

Next, a conductive paste for forming terminal electrodes containing Ag as a conducting constituent was applied to the ceramic laminates of Sample Nos. 1 to 13 so as to be electrically and mechanically connected to the internal electrodes exposed to end faces of the ceramic laminate, followed by drying and baking to form a pair of terminal electrodes. Thus, monolithic ceramic capacitors of Sample Nos. 1 to 13 were fabricated.

With respect to the monolithic ceramic capacitors of Sample Nos. 1 to 13, the occurrence of delamination between the ceramic layers, the coverage (coverage of internal electrodes), the occurrence of cracking and the ESR were measured, and evaluations were made. The results thereof are shown in Table 3.

With respect to the occurrence of delamination, each monolithic ceramic capacitor was cut in a direction orthogonal to the longitudinal direction, and after the cut area was polished, observations were carried out using a microscope. The occurrence of delamination was visually determined with respect to 100 pieces of each sample, and the number of pieces in which delamination occurred was checked.

In order to determine the coverage, the surface of the internal electrode was separated in each monolithic ceramic capacitor, and the state of the surface of the internal electrode in which holes were made was micrographed, and then quantification was performed by image analysis.

With respect to the occurrence of cracking, after each monolithic ceramic capacitor was embedded in a resin, the monolithic ceramic capacitor was cut in a direction orthogonal to the longitudinal direction. The cut area was polished, and observations were made using a microscope. The occurrence of cracking was visually determined with respect to 100 pieces of each sample, and the number of pieces in which cracking occurred was checked.

The ESR was measured after terminal electrodes were formed by applying a conductive thick-film paste containing Ag as a conductive constituent to both end faces of each monolithic ceramic capacitor, followed by baking. The average of ESRs of 100 pieces in each sample was calculated.

Monolithic ceramic capacitors which were particularly superior in the occurrence of delamination, coverage, occurrence of cracking and ESR in comparison with the monolithic ceramic capacitor using the metal powder produced by the vapor phase process, were ranked "A". Monolithic ceramic capacitors which were superior in the occurrence of delamination, coverage and occurrence of cracking but had a higher ESR in comparison with the monolithic ceramic capacitor using the metal powder produced by the vapor phase process, were ranked "B". Any monolithic ceramic capacitor having a significant amount of delamination or cracking or having an ESR significantly higher than 152 was ranked "F".

TABLE 3

Monolithic Ceramic Electronic Component

| Sample No. | Delamination (%) | Coverage (%) | Cracking (%) | ESR ($\Omega$) | Evaluation | Comprehensive Evaluation |
|---|---|---|---|---|---|---|
| 1 | 0 | 93 | 0 | 512 | F | C |
| 2 | 0 | 92 | 0 | 205 | B | B |
| 3 | 0 | 91 | 0 | 131 | A | B |
| 4 | 0 | 91 | 0 | 128 | A | B |
| 5 | 0 | 90 | 0 | 126 | A | B |
| 6 | 0 | 89 | 0 | 125 | A | B |
| 7 | 0 | 87 | 0 | 123 | A | B |
| 8 | 0 | 87 | 0 | 122 | A | B |
| 9 | 0 | 87 | 0 | 120 | A | B |
| 10 | 13 | 84 | 12 | 118 | F | C |
| 11 | 15 | 84 | 13 | 118 | F | C |
| 12 | 67 | 59 | 60 | 111 | F | F |
| 13 | 0 | 85 | 0 | 152 | — | — |

As is obvious from Tables 1 and 3, the monolithic ceramic capacitors of Sample Nos. 2 to 9 in which internal electrodes were formed using conductive pastes containing metal powders produced using mixed metallic salt solutions containing about 5 to $4.6 \times 10^{-7}$ percent by weight of copper relative to 100% by weight of nickel, had an occurrence of delamination of 0%, occurrence of cracking of 0%, coverage of 87% or more and the ESR was 205 $\Omega$ or less, thus exhibiting superior characteristics as monolithic ceramic capacitors.

In comparison with the monolithic ceramic capacitor of Sample No. 13 in which the metal powder was produced by the vapor phase process, the monolithic ceramic capacitors of Sample Nos. 3 to 9 were superior in the occurrence of delamination, the occurrence of cracking and the ESR, thus being most superior.

With respect to the monolithic ceramic capacitor of Sample No. 1, in which internal electrodes were formed using the conductive paste containing the metal powder produced using the mixed metallic salt solution containing Cu in an amount exceeding about 5.0% by weight relative to 100% by weight of nickel, although the occurrence of delamination was 0%, the coverage was 93% and the occurrence of cracking was 0%, the ESR was as high as 512 $\Omega$, and therefore, in the comprehensive evaluation, the monolithic ceramic capacitor of Sample No. 1 was slightly inferior to the monolithic ceramic capacitors of Sample Nos. 2 to 9.

With respect to the monolithic ceramic capacitors of Sample Nos. 10 and 11 in which internal electrodes were formed using the conductive pastes containing the metal powders produced using the mixed metallic salt solution containing Cu in an amount less than about $4.6 \times 10^{-7}$ percent by weight relative to 100% by weight of nickel, although the ESR was 118 $\Omega$, which was the lowest among the ceramic capacitors of Sample Nos. 1 to 11, the occurrence of delamination was 13 to 15%, the occurrence of cracking was 12 to 13% and the coverage was 84%, and therefore, in the comprehensive evaluation, the monolithic ceramic capacitors of Sample Nos. 10 and 11 were slightly inferior to the monolithic ceramic capacitors of Sample Nos. 2 to 9.

In contrast, with the monolithic ceramic capacitor of Sample No. 12 in which internal electrodes were formed using the conductive paste containing the metal powder which did not contain copper, the occurrence of delamination was 67%, the coverage was 59%, the occurrence of cracking was 60% and the ESR was almost unmeasurable, thus exhibiting characteristics which were obviously inferior to the monolithic ceramic capacitors of Sample Nos. 2 to 9.

Additionally, comprehensive evaluation results are shown in Table 3, in consideration of the evaluations regarding the average particle size of the metal powders (Table 2) and the evaluations regarding the monolithic ceramic capacitors (Table 3). With respect to the comprehensive evaluation, samples having superior characteristics were ranked "B", samples which was sufficiently practical were ranked "C", and samples believed to be impractical was ranked "F", using the sample of Sample No. 13 as the point of reference.

EXAMPLE 2

Production and Evaluation of Metal Powder

Metal powders of Sample Nos. 14 to 25 were produced in a manner similar to that in Example 1, apart from the fact that a mixed solvent containing ethanol and water at a ratio of 50:50 was used instead of ethanol which was used as the solvent in Example 1; 50.0 g of nickel sulfate (Ni content 12.3 g) was used as a nickel salt, as shown in Table 4 below; and copper sulfate was used in the amount shown in Table 4, that is, $1.5 \times 10$ to $1.5 \times 10^{-9}$ g (Cu content: 5.6 to $5.6 \times 10^{-10}$ g) for Sample Nos. 14 to 24.

TABLE 4

| Sample No. | Nickel salt Ni (g) | Nickel sulfate (g) | Copper Cu (g) | Copper Sulfate (g) | Cu/Ni (%) |
|---|---|---|---|---|---|
| 14 | 12.3 | 50.0 | 5.6 | 15 | 46 |
| 15 | | | $5.6 \times 10^{-1}$ | 1.5 | 4.6 |
| 16 | | | $5.6 \times 10^{-2}$ | $1.5 \times 10^{-1}$ | $4.6 \times 10^{-1}$ |
| 17 | | | $5.6 \times 10^{-3}$ | $1.5 \times 10^{-2}$ | $4.6 \times 10^{-2}$ |
| 18 | | | $5.6 \times 10^{-4}$ | $1.5 \times 10^{-3}$ | $4.6 \times 10^{-3}$ |
| 19 | | | $5.6 \times 10^{-5}$ | $1.5 \times 10^{-4}$ | $4.6 \times 10^{-4}$ |
| 20 | | | $5.6 \times 10^{-6}$ | $1.5 \times 10^{-5}$ | $4.6 \times 10^{-5}$ |
| 21 | | | $5.6 \times 10^{-7}$ | $1.5 \times 10^{-6}$ | $4.6 \times 10^{-6}$ |
| 22 | | | $5.6 \times 10^{-8}$ | $1.5 \times 10^{-7}$ | $4.6 \times 10^{-7}$ |
| 23 | | | $5.6 \times 10^{-9}$ | $1.5 \times 10^{-8}$ | $4.6 \times 10^{-8}$ |
| 24 | | | $5.6 \times 10^{-10}$ | $1.5 \times 10^{-9}$ | $4.6 \times 10^{-9}$ |
| | | 25 | | — | |
| 13 | | | Produced by Vapor Phase Process | | |

With respect to the metal powders of Sample Nos. 14 to 25 thus obtained and the metal powder of Sample 13 which was produced by the vapor phase process and was used as a comparative sample in Example 1, the Ni content, the Cu content, the ratio of Cu relative to 100% by weight of Ni and the average particle size were determined, and the average particle size was evaluated. The results thereof are shown in Table 5. The measurement and the evaluation were performed in the same manner as that in Example 1.

Figure 2:
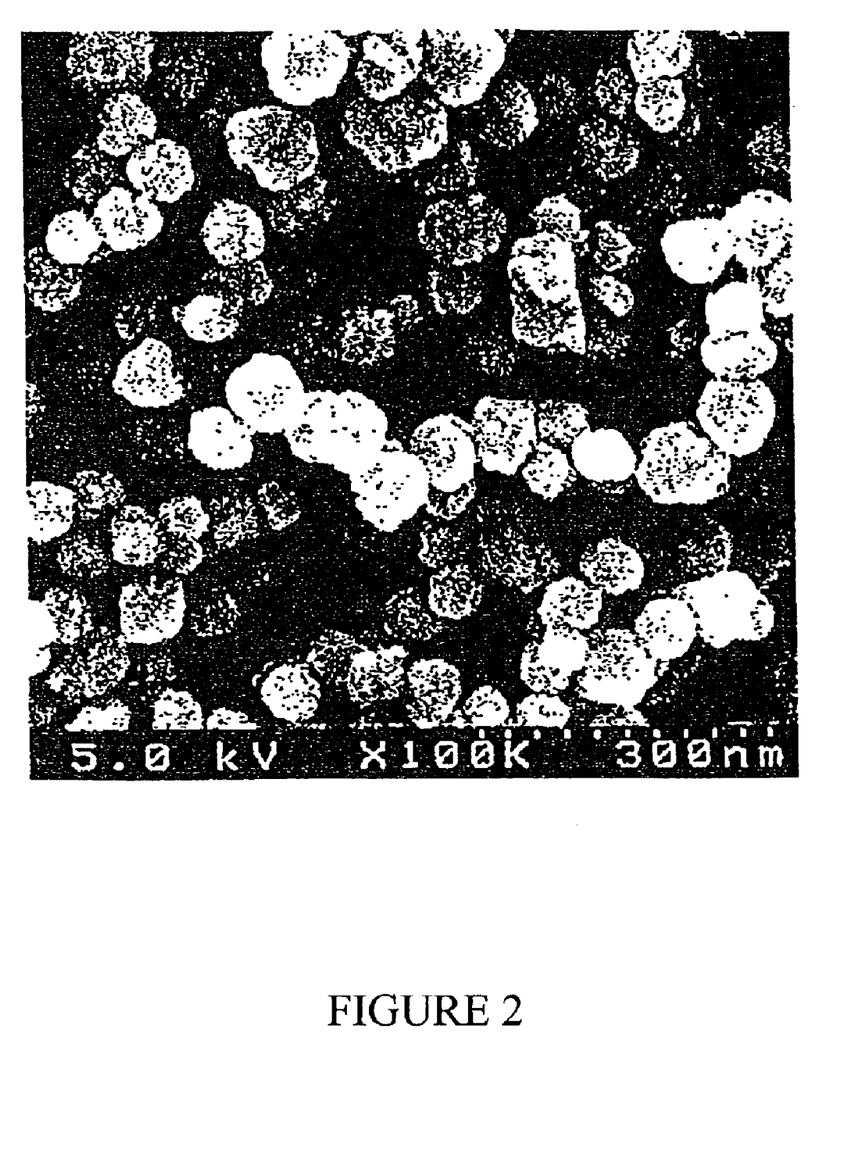
FIG. 2 is a representation of a photomicrograph of a metal powder in an embodiment of the present invention taken using a scanning electron microscope.
Figure 3:
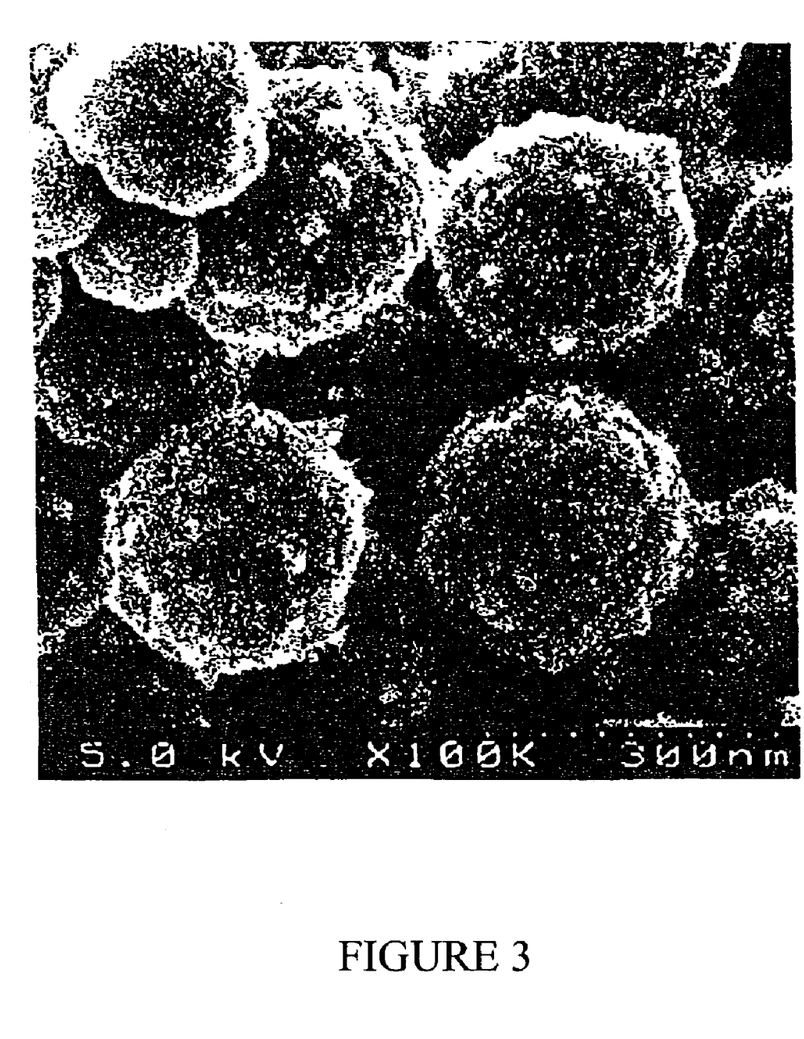
FIG. 3 is a representation of photomicrograph of a metal powder produced by a conventional method taken using a scanning electron microscope.

FIGS. 2 and 3 are representations of a micrograph taken by a scanning electron microscope of the metal powder of Sample No. 16 containing copper particles as nuclei and the conventional metal powder of Sample No. 25, respectively.

TABLE 5

| Sample No. | Ni Content (wt %) | Cu Content (wt %) | Cu/Ni (%) | Average Particle Size (nm) | Evaluation |
|---|---|---|---|---|---|
| 14 | 65.3 | 28.4 | 43.5 | 49 | A |
| 15 | 91.3 | 4.22 | 4.62 | 52 | B |
| 16 | 93.7 | $4.29 \times 10^{-1}$ | $4.58 \times 10^{-1}$ | 55 | B |
| 17 | 94.3 | $4.31 \times 10^{-2}$ | $4.57 \times 10^{-2}$ | 58 | B |
| 18 | 95.1 | $4.34 \times 10^{-3}$ | $4.56 \times 10^{-3}$ | 59 | B |
| 19 | 96.2 | $4.35 \times 10^{-4}$ | $4.52 \times 10^{-4}$ | 62 | B |
| 20 | 96.6 | $4.37 \times 10^{-5}$ | $4.52 \times 10^{-5}$ | 63 | B |
| 21 | 97.2 | $4.39 \times 10^{-6}$ | $4.52 \times 10^{-6}$ | 66 | B |
| 22 | 97.3 | $4.42 \times 10^{-7}$ | $4.54 \times 10^{-7}$ | 68 | B |
| 23 | 98.3 | $4.44 \times 10^{-8}$ | $4.52 \times 10^{-8}$ | 152 | C |
| 24 | 98.4 | $4.45 \times 10^{-9}$ | $4.52 \times 10^{-9}$ | 167 | C |
| 25 | 98.7 | — | | 241 | F |
| 13 | 97.3 | — | | 80 | — |

As is obvious from Table 5, the average particle sizes of the metal powders of Sample Nos. 14 to 22 containing copper particles as nuclei were smaller than 241 nm the average particle size of the metal powder of Sample No. 25 which did not contain copper.

As the Cu content increased, the average particle size decreased, and the metal powder of Sample No. 14, in which the Cu content was 4.35×10 percent by weight relative to 100% by weight of Ni, had the smallest average particle size at 49 nm.

As is obvious from FIGS. 2 and 3, the metal powder of Sample No. 16 had a smaller particle size than that of the conventional metal particle, and the particle size was less than 100 nm.

Fabrication and Evaluation of Monolithic Ceramic Capacitor

Conductive pastes and monolithic ceramic capacitors of Sample Nos. 14 to 25 were formed in a manner similar to that in Example 1, apart from the fact that the metal powders of Sample Nos. 14 to 25 were used instead of the metal powders of Sample Nos. 1 to 13 used in Example 1.

With respect to the monolithic ceramic capacitors of Sample Nos. 14 to 25 and of Sample No. 13 used as a comparative sample in Example 1, the occurrence of delamination between the ceramic layers, the coverage, the occurrence of cracking and the ESR were measured, and evaluations were made. The results thereof are shown in Table 6. The measurement methods were the same as those in Example 1.

TABLE 6

| | Monolithic Ceramic Electronic Component | | | | | |
|---|---|---|---|---|---|---|
| Sample No. | Delamination (%) | Coverage (%) | Cracking (%) | ESR (Ω) | Evaluation | Comprehensive Evaluation |
| 14 | 0 | 90 | 0 | 498 | F | C |
| 15 | 0 | 88 | 0 | 205 | B | B |
| 16 | 0 | 87 | 0 | 189 | A | B |
| 17 | 0 | 87 | 0 | 175 | A | B |
| 18 | 0 | 85 | 0 | 168 | A | B |
| 19 | 0 | 84 | 0 | 166 | A | B |
| 20 | 0 | 83 | 0 | 164 | A | B |
| 21 | 0 | 83 | 0 | 162 | A | B |
| 22 | 0 | 82 | 0 | 162 | A | B |
| 23 | 57 | 62 | 64 | 160 | F | C |
| 24 | 61 | 59 | 68 | 158 | F | C |
| 25 | 67 | 59 | 100 | 142 | F | F |
| 13 | 0 | 85 | 0 | 152 | — | — |

As is obvious from Tables 4 and 6, with respect to the monolithic ceramic capacitors of Sample Nos. 15 to 22 in which internal electrodes were formed using conductive pastes containing metal powders produced using mixed metallic salt solutions containing about 5 to $4.6 \times 10^{-7}$ percent by weight of copper relative to 100% by weight of nickel, the occurrence of delamination was 0%, the occurrence of cracking was 0%, the coverage was 82% or more and the ESR was 205 Ω or less, thus exhibiting superior characteristics as monolithic ceramic capacitors. In comparison with the monolithic ceramic capacitor of Sample No. 13 in which the metal powder was produced by the vapor phase process, the monolithic ceramic capacitors of Sample Nos. 16 to 22 were superior or substantially equal in the occurrence of delamination and the occurrence of cracking, excluding the ESR, thus being most superior.

With respect to the monolithic ceramic capacitor of Sample No. 14 in which internal electrodes were formed using the conductive paste containing the metal powder produced using the mixed metallic salt solution containing Cu in an amount exceeding 5% by weight relative to 100% by weight of nickel, although the occurrence of delamination was 0%, the coverage was 90% and the occurrence of cracking was 0%, the ESR was as high as 498 Ω, and therefore, the monolithic ceramic capacitor of Sample No. 14 was slightly inferior to the monolithic ceramic capacitors of Sample Nos. 15 to 22.

With respect to the monolithic ceramic capacitors of Sample Nos. 23 and 24 in which internal electrodes were formed using the conductive pastes containing the metal powders produced using the mixed metallic salt solution containing Cu in an amount less than $4.6 \times 10^{-7}$ percent by weight relative to 100% by weight of nickel, although the ESR was 158 to 160 Ω, which was the lowest among the ceramic capacitors of Sample Nos. 14 to 24, the occurrence of delamination was 57 to 61%, the occurrence of cracking was 64 to 68%, the coverage was 59 to 62% and therefore, in the comprehensive evaluation, the monolithic ceramic capacitors of Sample Nos. 23 and 24 were slightly inferior to the monolithic ceramic capacitors of Sample Nos. 15 to 22.

In contrast, with respect to the monolithic ceramic capacitor of Sample No. 25, in which internal electrodes were formed using the conductive paste containing the metal powder which did not contain copper, the occurrence of delamination was 67%, the coverage was 59%, the occurrence of cracking was 100% and the ESR was almost unmeasurable, thus exhibiting characteristics which were obviously inferior to the monolithic ceramic capacitors of Sample Nos. 15 to 22.

In Table 6, comprehensive evaluation results are also shown in consideration of the evaluations regarding the average particle size of the metal powders (Table 5) and the evaluations regarding the monolithic ceramic capacitors (Table 6). The comprehensive evaluations were made in the same manner as that in Example 1.

What is claimed is:

1. A Ni powder produced by a method comprising:
providing a reducing agent solution;
providing a mixed metallic salt solution comprising a nickel salt and a copper salt dissolved in a solvent; and
mixing the reducing agent solution and the mixed metallic salt solution such that the copper salt is reduced to precipitate copper particle nuclei and then the nickel salt is reduced to precipitate nickel around the copper particle nuclei,
wherein the copper content is in the range of about $4.54 \times 10^{-7}$ to 4.62 percent by weight relative to the weight of nickel in the metal powder.

2. A Ni powder according to claim 1, wherein the metal powder has an average particle size of about 100 nm or less.

3. In a conductive paste comprising a metal powder and an organic vehicle, the improvement which comprises the metal powder being a Ni powder according to claim 2.

4. In a monolithic ceramic electronic component comprising a ceramic laminate comprising a plurality of dielectric ceramic layers and at least two spaced apart internal electrodes therein, the improvement which comprises the internal electrodes comprising a metal powder according to claim 2.

5. In a method of producing a monolithic ceramic electronic component comprising firing a green ceramic laminate comprising a plurality of green dielectric ceramic layers and at least two spaced apart internal electrode pastes therein, the improvement which comprises utilizing electrode pastes comprising a metal powder according to claim 2 and an organic vehicle.

6. The nickel power of claim 2, wherein the amounts of nickel and copper in the solution are such that the metal powder has an average particle size of about 95 nm or less.

7. In a conductive paste comprising a metal powder and an organic vehicle, the improvement which comprises the metal powder being a Ni powder according to claim 1.

8. In a monolithic ceramic electronic component comprising a ceramic laminate comprising a plurality of dielectric ceramic layers and at least two spaced apart internal electrodes therein, the improvement which comprises the internal electrodes comprising a metal powder according to claim 1.

9. In a method of producing a monolithic ceramic electronic component comprising firing a green ceramic laminate comprising a plurality of green dielectric ceramic layers and at least two spaced apart internal electrode pastes therein, the improvement which comprises utilizing electrode pastes comprising a metal powder according to claim 1 and an organic vehicle.

10. A Ni powder comprising particles of nickel having copper particulate nuclei, wherein the copper content is in the range of about $4.54 \times 10^{-7}$ to 4.62 percent by weight relative to the weight of nickel in the metal powder.

11. A Ni powder according to claim 10, wherein the metal powder has an average particle size of about 100 nm or less.

12. In a conductive paste comprising a metal powder and an organic vehicle, the improvement which comprises the metal powder being a Ni powder according to claim 11.

13. In a monolithic ceramic electronic component comprising a ceramic laminate comprising a plurality of dielectric ceramic layers and at least two spaced apart internal electrodes therein, the improvement which comprises the internal electrodes comprising a metal powder according to claim 11.

14. In a method of producing a monolithic ceramic electronic component comprising firing a green ceramic laminate comprising a plurality of green dielectric ceramic layers and at least two spaced apart internal electrode pastes therein, the improvement which comprises utilizing electrode pastes comprising a metal powder according to claim 11 and an organic vehicle.

15. The nickel powder of claim 11, wherein the metal powder has an average particle size of about 95 nm or less.

16. In a conductive paste comprising a metal powder and an organic vehicle, the improvement which comprises the metal powder being a Ni powder according to claim 10.

17. In a monolithic ceramic electronic component comprising a ceramic laminate comprising a plurality of dielectric ceramic layers and at least two spaced apart internal electrodes therein, the improvement which comprises the internal electrodes comprising a metal powder according to claim 10.

18. In a method of producing a monolithic ceramic electronic component comprising firing a green ceramic laminate comprising a plurality of green dielectric ceramic layers and at least two spared apart internal electrode pastes therein, the improvement which comprises utilizing electrode pastes comprising a metal powder according to claim 10 and an organic vehicle.

* * * * *